June 7, 1927.
V. BARDIN
1,631,456
VALVED PIPE COUPLING
Filed Feb. 3. 1925
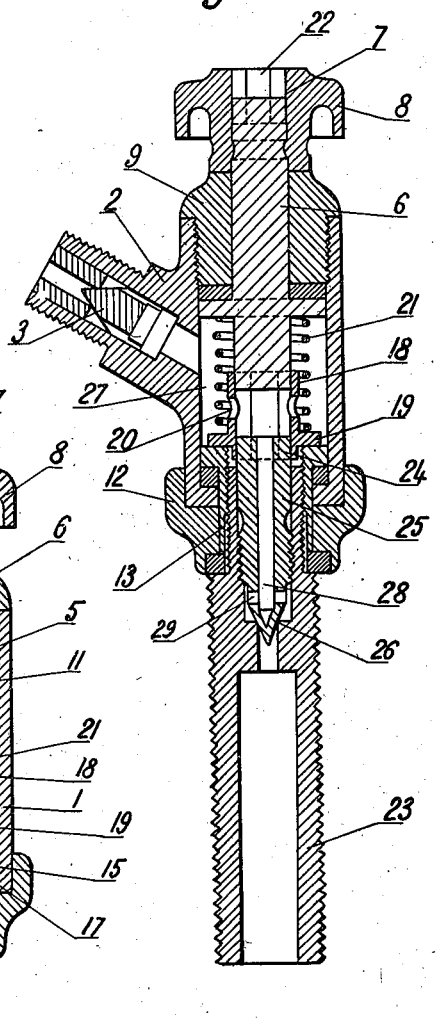
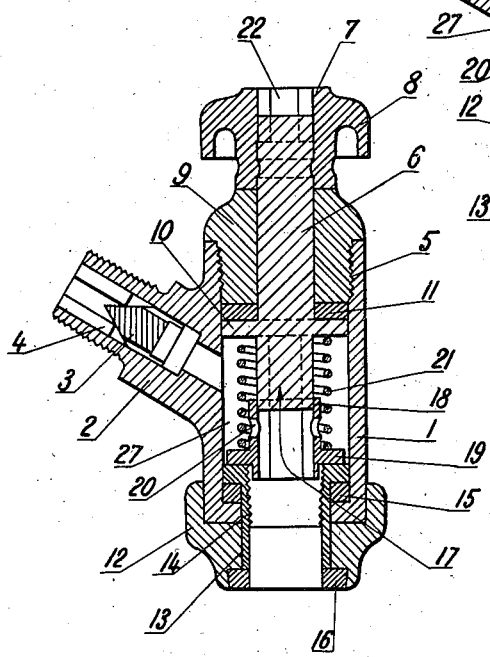
Inventor
V. Bardin
By Marks&Clerk
Attys.

Patented June 7, 1927.

1,631,456

UNITED STATES PATENT OFFICE.

VICTOR BARDIN, OF ST.-DENIS, FRANCE.

VALVED PIPE COUPLING.

Application filed February 3, 1925, Serial No. 6,647, and in France February 6, 1924.

The object of my invention is a valved pipe coupling comprising a threaded sleeve screwed on the nose of a valve, a mechanism being provided for controlling the valve from the outside. The valve is constituted by a needle the top part of which shows cants whereby the said mechanism can take hold of it so as to screw it on its seat. The valve not being provided with a flap valve, the latter should be if necessary inserted in the threaded sleeve except if a flap-valve is already provided on one of the parts which the valved pipe coupling connects. These parts can be pipe lines or else the coupling can be used for inflating air tubes in which case the coupling acts as a pump connection, connected on one side with the pump and on the other with the air tube.

Appended drawings show, by way of example, device embodying the principle of my invention.

Fig. 1 is a longitudinal section of the threaded sleeve.

Fig. 2 is another view, also in longitudinal section of the complete device comprising the valve.

The pipe coupling comprises essentially a threaded sleeve or cylindrical body 1 provided with an external projection 2, perpendicular or inclined with reference to said body, wherein the flap-valve 3 is allowed to move and may rest on its seat 4.

A cylindrical hole of big diameter is bored along the axis of cylinder and is threaded at its higher end in 5.

Inside said body a shaft 6 is adapted to rotate. Its upper part is countersunk, so as to show cants, for instance, six cants, as shown, whereon a milled knob 8 is fitted, said knob being prevented from moving longitudinally; a plug 9 upon which the lower part of milled knob 8 rests surrounds shaft 6 and is screwed into the threaded part 5.

The shaft 6 shows inside the body 1 a flange 10 the diameter of which is exactly such as will fit into the interior diameter of said body. An air-tight washer 11 is pressed between the top of flange 10 and the bottom of plug 9. A milled part 12 termed an external connection surrounds the bottom of body 1 round which it can rotate. An internal connection 13 turned and threaded in 14 to correspond to the thread on the nose of the valve is forced inside the external connection. The first threads are cut off so as to help the setting of the connection and to shorten the duration of the screwing. A yielding washer 15 is pressed betweeen the bottom of body 1 and a shoulder provided at the top of internal flange 13. A yielding washer 16 is inserted under the lower ends of internal and external connections. The lower part 17 of shaft 6 is countersunk in a way exactly corresponding to the shape of the upper polygonal part 24 of the needle 25 of the valve. Round the countersunk part 17 is set a slide 18 showing externally and round its bottom a flange 19 above which said slide is provided with holes such as 20. A compression spring 21 is placed between the lower part of flange 10 on shaft 6 and the flange 19 of the slide and tends to urge constantly said slide towards its lower position. The higher end of shaft 6 stops short a little below the level of the top surface of knob 8, whereby a polygonal hollow 22 is formed. The polygonal hollows formed by knob 8 and slide 18 are such as will follow exactly the shape of respectively shaft 6 and head 24 of needle 25 of the valve. Said valve comprises a body 23 which connects a pipe line or an air-chamber with another pipe coupling or a pump and the end of which forms the nose on which is screwed the connection 13 of the threaded sleeve. The interior of body is threaded so as to lodge needle 25 the lower end of which shows a conical part which can bear upon its seat 26. The needle 25 is bored along its axis 28 and the passage thus obtained stops a little above the lower part of the needle and communicates with the outer lower part of same through the two lateral air-holes 29.

The above-described device works as follows: when air is to pass through the coupling, the threaded sleeve is screwed on the nose of the valve by turning the external connection 12 which is to be fitted tight on the nose. The top polygonal part 24 of needle 25 is set in the polygonal hollow 19 of the slide 18. When this is obtained the milled knob is turned in the direction which causes needle 25 to unscrew, by means of shaft 6 and slide 18. It is easy to see said unscrewing can be done without any escape of air through the threads of connection as latter is screwed on the nose of valve.

When the needle is thus raised from its seat 26, the air can pass through the coupling and if latter is used as a pump connection to an air-chamber, said air-chamber will be inflated. The air passes through flap valve 3 into chamber 27 and from said chamber through the holes 20 and the central bore 28 into the valve body 23 and the pipe line or air-chamber connected thereto.

When the valve is to be closed it is sufficient to turn the milled knob 8 in the opposite direction from that of the previous rotation to force the needle 25 back again on its seat.

When the above-described coupling is intended for uses such as discharging air from an air chamber of a tyre with which part 23 is connected, the needle 25 being screwed on its seat, it is sufficient to take hold of the top polygonal part of the needle, so as to unscrew said needle, through the hollow 22 above shaft 6.

What I claim is:

A valved pipe-coupling comprising a valve body, a threaded needle in said valve body, a seat provided on the valve body for said needle, a passage formed in said needle, lateral openings at the bottom of said passage, a central opening at the top of same, a polygonal head formed on the top of needle, an internal connection screwed on the valve body, an external connection surrounding said internal connection, a threaded sleeve inserted between the internal and external connections, a plug screwed in said sleeve, a chamber provided in same and communicating with the exterior, a polygonal slide fitting on the polygonal head of the needle and resting on the internal connection inside the chamber, holes in the walls of the slide, a shaft fitting inside the slide above the polygonal head and passing through the plug, a spring disposed round said shaft and urging the slide downwards, and an external knob actuating the shaft.

In witness whereof I have hereunto set my hand.

VICTOR BARDIN.